(12) United States Patent
Kim

(10) Patent No.: US 9,043,318 B2
(45) Date of Patent: May 26, 2015

(54) MOBILE TERMINAL AND PHOTO SEARCHING METHOD THEREOF

(71) Applicant: LG Electronic Inc., Seoul (KR)

(72) Inventor: Yeongoo Kim, Gwangmyeong (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 13/750,428

(22) Filed: Jan. 25, 2013

(65) Prior Publication Data
US 2013/0198176 A1    Aug. 1, 2013

(30) Foreign Application Priority Data

Jan. 26, 2012    (KR) ........................ 10-2012-0007753

(51) Int. Cl.
*G06F 17/30*    (2006.01)

(52) U.S. Cl.
CPC .... *G06F 17/30277* (2013.01); *G06F 17/30265* (2013.01)

(58) Field of Classification Search
USPC .......................................... 707/724, 758, 725
See application file for complete search history.

(56) References Cited

U.S. PATENT DOCUMENTS

| | | | |
|---|---|---|---|
| 7,797,019 B2* | 9/2010 | Friedmann | 455/556.1 |
| 8,397,166 B2* | 3/2013 | Matsumoto | 715/731 |
| 8,698,843 B2* | 4/2014 | Tseng | 345/633 |
| 2004/0070673 A1* | 4/2004 | Nakamura | 348/207.2 |
| 2005/0027600 A1* | 2/2005 | Phillips | 705/14 |
| 2007/0091123 A1* | 4/2007 | Akashi | 345/629 |
| 2007/0233368 A1* | 10/2007 | Friedmann | 701/208 |
| 2010/0083117 A1* | 4/2010 | Matsumoto | 715/731 |
| 2010/0257195 A1* | 10/2010 | Inoue et al. | 707/769 |
| 2010/0305844 A1* | 12/2010 | Choi et al. | 701/201 |
| 2011/0141254 A1* | 6/2011 | Roebke et al. | 348/61 |
| 2011/0254861 A1* | 10/2011 | Emura et al. | 345/633 |
| 2011/0292076 A1* | 12/2011 | Wither et al. | 345/632 |
| 2011/0319131 A1* | 12/2011 | An et al. | 455/556.1 |
| 2012/0001939 A1* | 1/2012 | Sandberg | 345/633 |
| 2012/0033070 A1* | 2/2012 | Yamazaki | 348/135 |

(Continued)

FOREIGN PATENT DOCUMENTS

| | | |
|---|---|---|
| KR | 10-2008-00446 10 A | 5/2008 |
| KR | 10-2011-01327 71 A | 12/2011 |
| KR | 10-2012-00033 23 A | 1/2012 |

OTHER PUBLICATIONS

Azuma et al., "Recent Advances in Augmented Reality", published in IEEE Computer Graphics and Applications, vol. 21, Issue 6, Nov./Dec. 2001, pp. 34-47.*

(Continued)

*Primary Examiner* — Phuong Thao Cao
(74) *Attorney, Agent, or Firm* — Birch, Stewart, Kolasch & Birch, LLP

(57) ABSTRACT

The present disclosure relates to a mobile terminal and a photo search method thereof capable of searching and displaying photos shared by the cloud and SNS systems in connection with a specific location on a camera view using augmented reality. To this end, according to the present disclosure, when a photo search function is selected on an augmented reality based camera view, photo information associated with at least one location on which the focus of the camera view is placed is searched from a network system to sort and display the searched photo information on the camera view, thereby allowing the user to conveniently search photos associated with old memories.

22 Claims, 19 Drawing Sheets

(56) References Cited

U.S. PATENT DOCUMENTS

| | | | |
|---|---|---|---|
| 2012/0105475 A1* | 5/2012 | Tseng | 345/633 |
| 2012/0113142 A1* | 5/2012 | Adhikari et al. | 345/633 |
| 2012/0113144 A1* | 5/2012 | Adhikari et al. | 345/633 |
| 2012/0114297 A1* | 5/2012 | Adhikari et al. | 386/224 |
| 2012/0116920 A1* | 5/2012 | Adhikari et al. | 705/26.61 |
| 2012/0120101 A1* | 5/2012 | Adhikari et al. | 345/633 |
| 2012/0192235 A1* | 7/2012 | Tapley et al. | 725/60 |
| 2013/0057582 A1* | 3/2013 | Aoki | 345/633 |
| 2013/0077835 A1* | 3/2013 | Kritt et al. | 382/118 |
| 2013/0150124 A1* | 6/2013 | Kim et al. | 455/556.1 |
| 2013/0169681 A1* | 7/2013 | Rasane et al. | 345/633 |
| 2013/0239019 A1* | 9/2013 | Pike et al. | 715/753 |
| 2013/0275411 A1* | 10/2013 | Kim et al. | 707/722 |
| 2013/0330007 A1* | 12/2013 | Kim et al. | 382/195 |
| 2013/0342574 A1* | 12/2013 | Tseng | 345/633 |
| 2014/0100996 A1* | 4/2014 | Klein et al. | 705/27.2 |
| 2014/0100997 A1* | 4/2014 | Mayerle et al. | 705/27.2 |
| 2014/0173592 A1* | 6/2014 | y Arcas et al. | 718/1 |
| 2014/0176348 A1* | 6/2014 | Acker et al. | 340/932.2 |
| 2014/0244160 A1* | 8/2014 | Cragun et al. | 701/436 |

OTHER PUBLICATIONS

Snavely et al., "Photo Tourism: Exploring Photo Collections in 3D", in Proceedings of ACM SIGGRAPH '06, 2006, pp. 835-846.*

Carboni et al., "GeoPix: Image Retrieval on the Geo Web, from Camera Click to Mouse Click", in Proceedings of the 8th Conference on Human-Computer Interaction with Mobile Devices and Services (MobileHCI '06), 2006, pp. 169-172.*

Girod et al., "Mobile Visual Search: Architectures, Technologies, and the Emerging MPEG Standard", published by the IEEE Computer Society, 2011, pp. 86-94.*

* cited by examiner

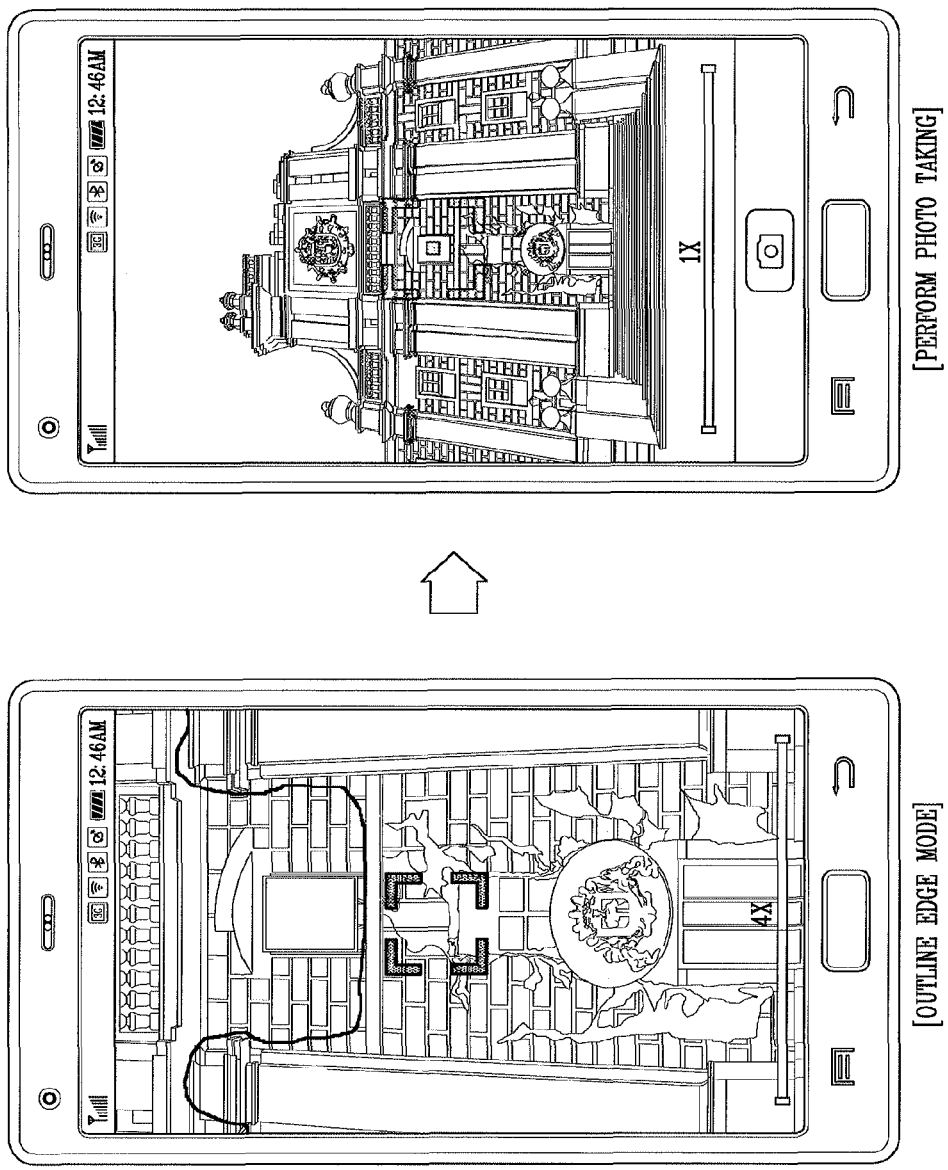

FIG. 9A
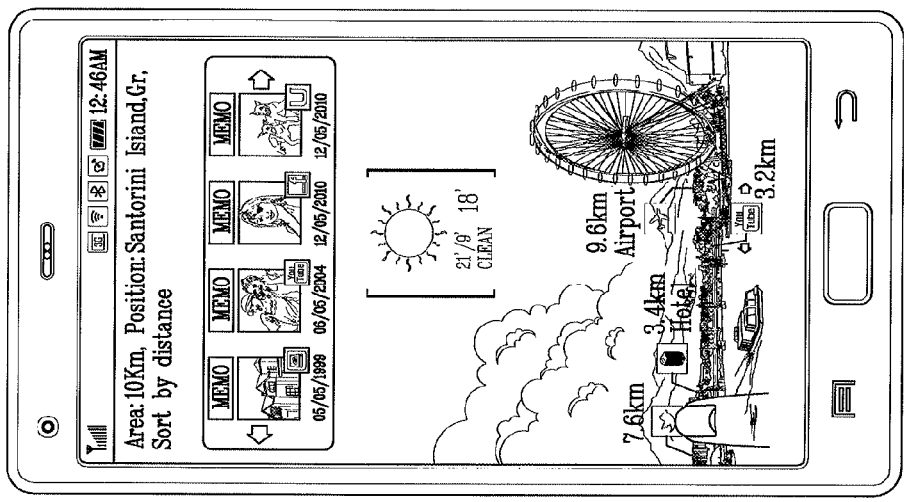
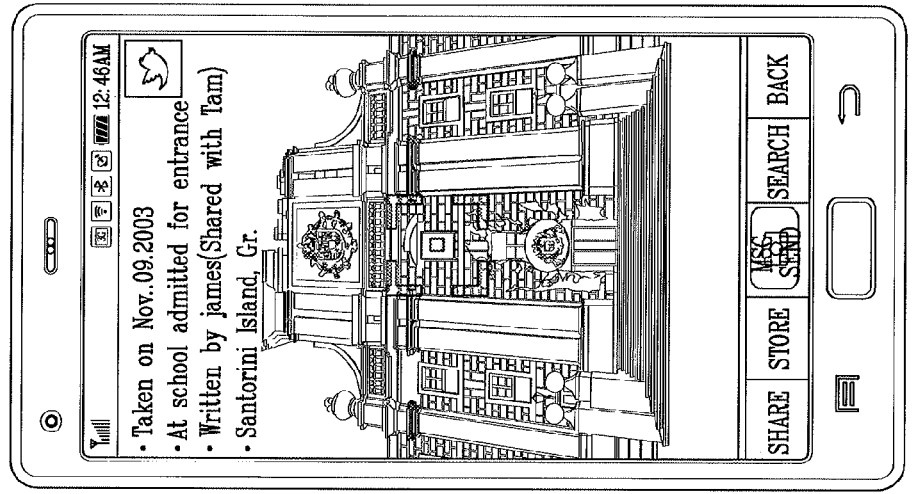

MOBILE TERMINAL AND PHOTO SEARCHING METHOD THEREOF

RELATED APPLICATION

Pursuant to 35 U.S.C. §119(a), this application claims the benefit of earlier filing date and right of priority to Korean Application No. 10-2012-0007753, filed on Jan. 26, 2012 the contents of which is incorporated by reference herein in its entirety.

BACKGROUND OF THE INVENTION

1. Field of the Invention

The present information relates to a mobile terminal and a photo search method thereof capable of retrieving and displaying a photo associated with a location on an augmented reality based camera view from a cloud and/or an SNS system.

2. Description of the Related Art

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal. Of them, a touch function of the mobile terminal allows even users who are unskilled in a button/key input to conveniently perform the operation of a terminal using a touch screen. In recent years, it has settled down as a key function of the terminal along with a user UI in addition to a simple input. Accordingly, as the touch function is applied to a mobile terminal in more various forms, the development of a user interface (UI) suitable to that function is further required.

In recent years, with the development of display technologies, mobile terminals have been evolved to display 3-dimensional (3D) stereoscopic images allowing depth perception and stereovision exceeding the level of displaying two-dimensional images, and its related products have been released in various manners. Accordingly, the user can use more realistic user interfaces or contents through a 3-dimensional (3D) stereoscopic image.

Augmented reality (AR) is a graphic technique of combining and showing a virtual object with a real environment seen by the user's eyes, and fundamentally, a technology in which virtual information is put on based on a real world.

Accordingly, studies for putting the augmented reality into practice have been carried out in various fields since starting studies on the augmented reality technologies. In recent years, due to the development of smart phones, various applications using augmented reality have been developed, thereby allowing a handheld augmented reality system with the computing performance enhancement of mobile devices and the development of wireless network devices, such as mobile terminals, personal digital assistants (PDAs), ultra mobile personal computers, and the like.

Examples of applications using augmented reality may include services providing building information or the like of a neighboring region (location) to the user using location information, and services such as image search and location information services providing search, mobile, shopping, advertisement, illustrated books, and the like using image recognition technologies, QR codes, and the like.

On the other hand, as cloud systems providing cloud computing environments through social network services, such as Twitter and Facebook, and virtual servers have been settled down, a lot of people store their own pictures in mobile terminals as well as show them to other people or manage them through the cloud system, blog and SNS. Accordingly, pictures captured with the passage of time (for example, from newborn to grown up) or various pictures for travels and events will be stored in a specific storage area of the cloud system, blog and SNS.

However, when the user visits the same place (e.g., sightseeing resort, event place, restaurant and others) after a predetermined period of time has passed, the user may carry his or her thought back to the past. If previously stored pictures can be retrieved and viewed in connection with the relevant place through a camera view of the mobile terminal, then it may be helpful to recall past events. However, such a function has not been provided yet by mobile terminals, and thus there is inconvenience in that the user must search pictures associated with the relevant place one by one among the previously stored pictures.

SUMMARY OF THE INVENTION

Accordingly, an object of the present invention is to provide a mobile terminal and a photo search method thereof capable of sorting and displaying photos and the location information of the photos shared by (or stored in) an SNS or cloud system using augmented reality and cloud technologies.

Another object of the present disclosure is to provide a mobile terminal and a photo search method thereof capable of capturing a photo with the same place and composition as the searched photo using augmented reality and cloud technologies.

In order to accomplish the foregoing objective, a photo search method in a mobile terminal according to an embodiment of the present disclosure may include displaying an augmented reality based camera view; searching photo information associated with at least one location on which the focus of the camera view is placed from a network system; and displaying the searched photo information at each location on the camera view.

The at least one location may include a tourist resort, a specific building, a mountain, a sea, a hometown and other places.

The photo information may include photo and location information and the photos are displayed in a region apart from the location information as photos captured at a location within a predetermined proximity distance.

The network system may include a cloud system and an SNS system, and the photo information is sorted and displayed for each time and distance.

The photo information may be updated to new photo information searched from the network system when a new location is entered on the camera view by the movement of the user or the user changes its search range.

When a specific photo is deleted from the network system, information associated with the relevant photo is deleted from the displayed information.

Said searching step may include checking the user's current location when a photo search function is selected; reading prestored search settings; searching photos within a contents display range shared by the DB source of the cloud and SNS systems around the search range based on the read search settings; and sorting the searched photos based on the sorting method and proximity distance.

The search settings may include a search range indicating a distance for searching photos from the user's current location; a contents display range indicating a kind of searched photos; a DB source indicating a service provider for searching photos; a sorting method for sorting the searched photos by time and distance; and a proximity distance range indicating a proximity distance to be displayed at a one side region of the camera view.

The photo search method of the mobile terminal may further include displaying photos captured at the relevant location when the displayed photo information is selected; searching information associated with the relevant location and displaying the information on the screen when a search function for the displayed photos is selected; and transmitting the displayed information to a network system.

The information associated with the relevant location may be searched from various blogs, twitters, papers and broadcasts, and the searched information may be transmitted via cloud, SNS, blog or email based on the user's selection.

The photo search method of the mobile terminal may further include displaying a list of locations at which the photos are captured when a trace function is selected in the state that the searched photo information is displayed; displaying routes from the closest location to the next location as arrows, respectively, when a specific location is selected from the list; and displaying the fastest road that can be moved to the relevant location when a specific arrow is selected from the arrows.

The photo search method of the mobile terminal may further include comparing the user's location with the location of the photo when a same place search function is selected while moving to the selected location; displaying a moving direction when the two locations are not the same, and displaying information for setting the composition of the camera view to the composition of a photo captured at the relevant location based on the user's mode setting when the two locations are the same; and performing a photo capture for the relevant location when the user moves or selects a zoom function based on the information such that the two compositions are identical.

The user's mode setting may be one of an outline edge mode for displaying that an outline of the existing photo is overlapped with a camera view and a synchronization rate mode indicating a synchronization rate between the composition of the camera view and the composition of the previous photo, and the information may be an outline or synchronization rate.

In order to accomplish the foregoing objective, a mobile terminal according to an embodiment of the present disclosure may include a display unit configured to display an augmented reality based camera view; a memory configured to store the user's search settings; and a controller configured to search photo information associated with at least one location on which the focus of the camera view is placed from a network system based on the search settings, and display the relevant photo information for each storage source on the camera view.

The at least one location comprises a tourist resort, a specific building, a mountain, a sea, a hometown and other places.

The search settings may include a search range indicating a distance for searching photos from the user's current location; a contents display range indicating a kind of searched photos; a DB source indicating a service provider for searching photos; a sorting method for sorting the searched photos by time and distance; and a proximity distance range indicating a proximity distance to be displayed at a one side region of the camera view.

The photo information may include photo and location information, and the photos may be displayed in a region apart from the location information as photos captured at a location within a predetermined proximity distance.

The network system may include a cloud system and an SNS system.

The controller may display the photo information by sorting them by time and distance.

The controller may update the photo information to new photo information searched from the network system when a new location is entered on the camera view or the user changes its search range.

The controller may delete information associated with the relevant photo based on the updated information of the network system when a specific photo is deleted from the network system.

The controller may check the user's current location when a photo search function is selected and then read prestored search settings, and search photos within a contents display range shared by the DB source of the cloud and SNS systems around the search range at a current location based on the read search settings, and sort the location information of the searched photos based on time and distance.

The controller may display photos captured at the relevant location when specific photo information is selected, and search information associated with the relevant location and display the information on the screen when a search function for the displayed photos is selected, and transmit the displayed information to a network system based on the user's input.

The controller may display a list of locations at which the photos are captured when a trace function is selected in the state that the searched photo information is displayed, and display routes from the closest location to the next location as arrows, respectively, when a specific location is selected from the list, and display the fastest road that can be moved to the relevant location when a specific arrow is selected from the arrows.

The controller may compare the user's location with the location of the photo when a same place search function is selected while moving to the selected location, and display a moving direction when the two locations are not the same, and display information for setting the composition of the camera view to the composition of a photo captured at the relevant location based on the user's mode setting when the two locations are the same, and perform a photo capture for the relevant location when the user moves or selects a zoom function based on the information such that the two compositions are identical.

The user's mode setting may be one of an outline edge mode for displaying that an outline of the existing photo is overlapped with a camera view and a synchronization rate mode indicating a synchronization rate between the composition of the camera view and the composition of the previous photo, and the information may be an outline or synchronization rate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A and 7B are views illustrating an example of performing a photo capture using an outline edge mode and a synchronization rate mode;

FIGS. 9A and 9B are views illustrating an example of selecting location information on a camera view and displaying photos associated with the relevant region;

DETAILED DESCRIPTION OF THE INVENTION

Hereinafter, a mobile terminal associated with the present disclosure will be described in more detail with reference to the accompanying drawings. A suffix "module" or "unit" used for constituent elements disclosed in the following description is merely intended for easy description of the specification, and the suffix itself does not give any special meaning or function. Therefore, it should be noted that the suffix "module" or "unit" may be interchangeably used each other.

A terminal can be implemented in various forms. A terminal disclosed herein may include mobile terminals such as a portable phone, a smart phone, a laptop computer, a digital broadcast terminal, a personal digital assistant (PDA), a portable multimedia player (PMP), a navigation, and the like, and stationary terminals such as a digital TV, a desktop computer, and the like. In the following description, it is assumed and described that the terminal is a mobile terminal. However, it would be easily understood by those skilled in the art that a configuration according to the following description may be applicable to the stationary terminal excluding constituent elements particularly configured for mobile purposes.

Figure 1:
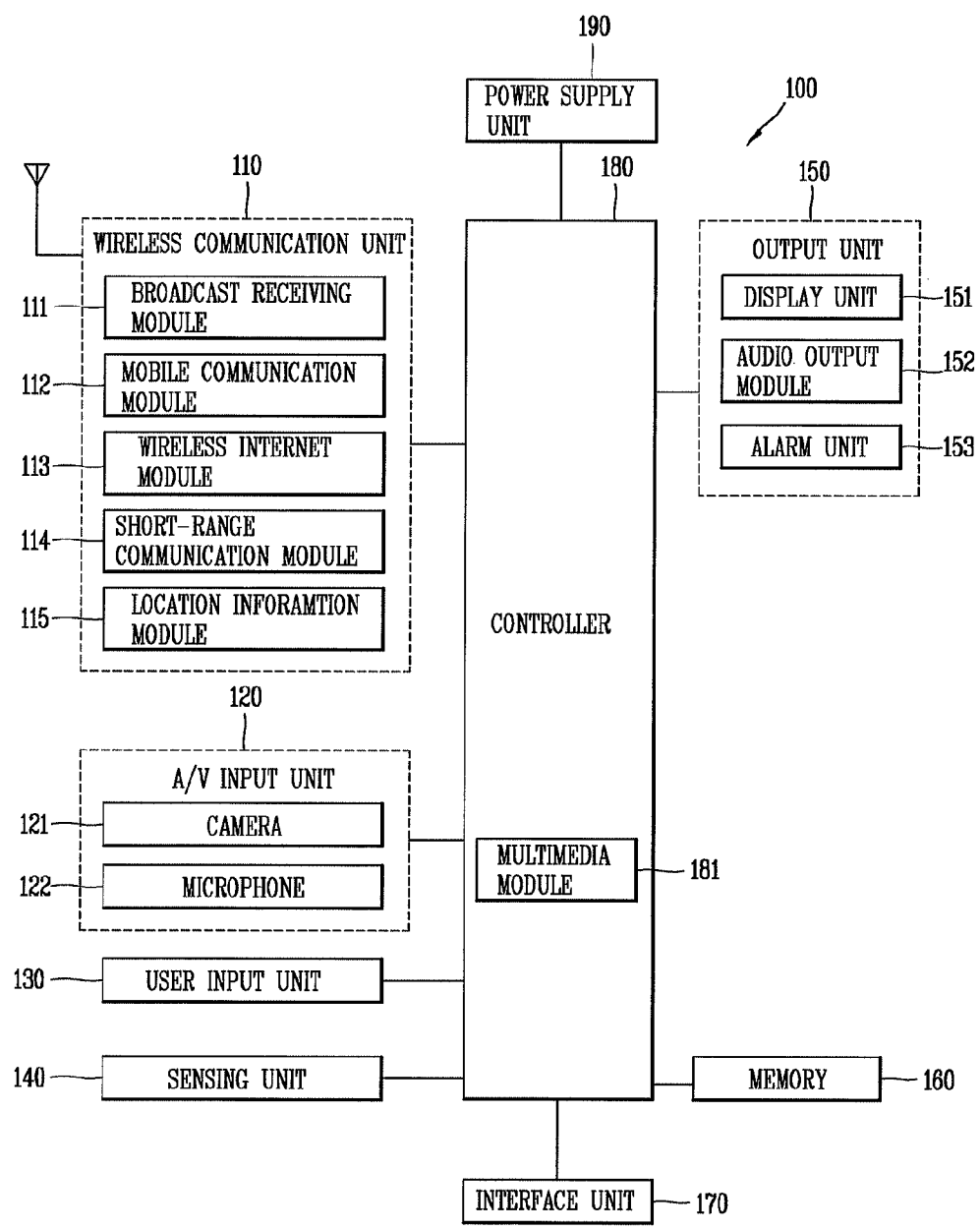
FIG. 1 is a block diagram illustrating a mobile terminal associated with an embodiment of the present disclosure.

FIG. 1 is a block diagram illustrating a mobile terminal associated with an embodiment of the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more modules allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast associated information may mean information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

Furthermore, the mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

Furthermore, the location information module 115 is a module for checking or acquiring a location of the mobile terminal, and there is a Global Positioning System (GPS) module as a representative example. According to current technologies, the GPS module calculates spaced-apart distance information and accurate time information from three or more satellites and then applies trigonometry to the calculated information, thereby accurately calculating current position information based on latitude, longitude, and height. At present, there is widely used a method of calculating position and time information using three satellites and correcting an error of the calculated position and time information using another satellite. Furthermore, the GPS module can calculate speed information by continuously calculating a current position in real time.

On the other hand, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like. Particularly, when the touch pad forms an interlayer structure together with a display unit 151 which will be described later, it may be called a touch screen.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141. It will be described later in association with a touch screen.

Furthermore, the sensing unit 140 may include a geomagnetic sensor calculating the movement direction when the user moves, a gyro sensor calculating the rotation direction and an acceleration sensor.

The interface unit 170 performs a role of interfacing with all external devices connected to the mobile terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

Here, the identification module may be configured as a chip for storing various information required to authenticate an authority for using the mobile terminal 100, which may include a User Identity Module (UIM), a Subscriber Identity Module (SIM), and the like. Also, the device provided with the identification module (hereinafter, referred to as 'identification device') may be implemented in the type of a smart card. Hence, the identification device can be coupled to the mobile terminal 100 via a port. The interface units 170, 175 may receive data or power from an external device and transfer the received data or power to each constituent element in the mobile terminal 100, or transmit data within the mobile terminal 100 to the external device.

Also, the interface unit 170 may serve as a path for power to be supplied from an external cradle to the mobile terminal 100 when the portable terminal 100 is connected to the external cradle, or as a path for transferring various command signals inputted from the cradle by the user to the mobile terminal 100. Such various command signals or power inputted from the cradle may be operated as signals for recognizing that the mobile terminal 100 has accurately been mounted on the cradle.

The output unit 150 is configured to provide an output for audio signal, video signal, or alarm signal, and the output unit 150 may include the display unit 151, an audio output module 152, an alarm unit 153, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call.

On the other hand, as described above, in case where the display unit 151 and the touch pad form an interlayer structure to constitute a touch screen, the display unit first display unit 151 may be used as an input device in addition to an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. Some of those displays may be configured with a transparent type to allow viewing of the exterior through the display unit, which may be called transparent displays. An example of the typical transparent displays may include a transparent LCD (TOLED), and the like. The display unit 151 may be implemented in two or more in number according to a configured aspect of the mobile terminal 100. For example; an external display unit (not shown) and an internal display unit (not shown) may be simultaneously provided on the mobile terminal 100. The touch screen may be configured to detect a touch input pressure as well as a touch input position and area.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the mobile terminal may include call received, message received, key signal input, touch input, and so on. The alarm 153 may output not only video or audio signals, but also other types of signals such as signals notifying occurrence of events in a vibration manner. When a call signal or message is received, the alarm 153 may output a vibration to notify this. Otherwise, when a key signal is inputted, the alarm 153 may output a vibration as a feedback to the inputted key signal. Through the foregoing vibration output, the user can recognize an event occurrence. The signal for notifying an event occurrence may be also outputted through the display unit 151 or the audio output module 152.

The memory 160 may store a program for processing and controlling of the controller 180, or may temporarily store input/output data (e.g., phonebook data, messages, still images, video and the like). Also, the memory 160 may store data related to various patterns of vibrations and audio output upon a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may manage a web storage which performs a storage function of the memory 160 on the Internet.

The controller 180 typically controls an overall operation of the portable terminal 100. For example, the controller 180 performs the control and processing associated with telephony calls, data communications, video calls, and the like. Furthermore, the controller 180 may include a multimedia module 181 for reproducing multimedia files. The multimedia module 181 may be implemented in the controller 180, or may be implemented separately from the controller 180.

The controller 180 can perform a pattern recognition processing so as to recognize handwriting or drawing input performed on the touch screen as a text or image.

The power supply unit 190 provides power required by various components under the control of the controller 180. The provided power may be internal power, or external power thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

A terminal 100 as illustrated in FIG. 1 may be configured to be operated in a communication system capable of transmitting data via frames or packets including a wireless or wired communication system and a satellite-based communication system.

Hereinafter, referring to FIG. 2, a communication system in which a terminal associated with the present invention is operable will be described.

A communication system may use different wireless interfaces and/or physical layers. For example, a wireless that can be used by a communication system may include Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), and the like. Hereinafter, for the sake of convenience of explanation, it will be described to be limited to CDMA. However, it is apparent that the present invention may be applicable to all kinds of communication systems including a CDMA wireless communication system.

Figure 2:
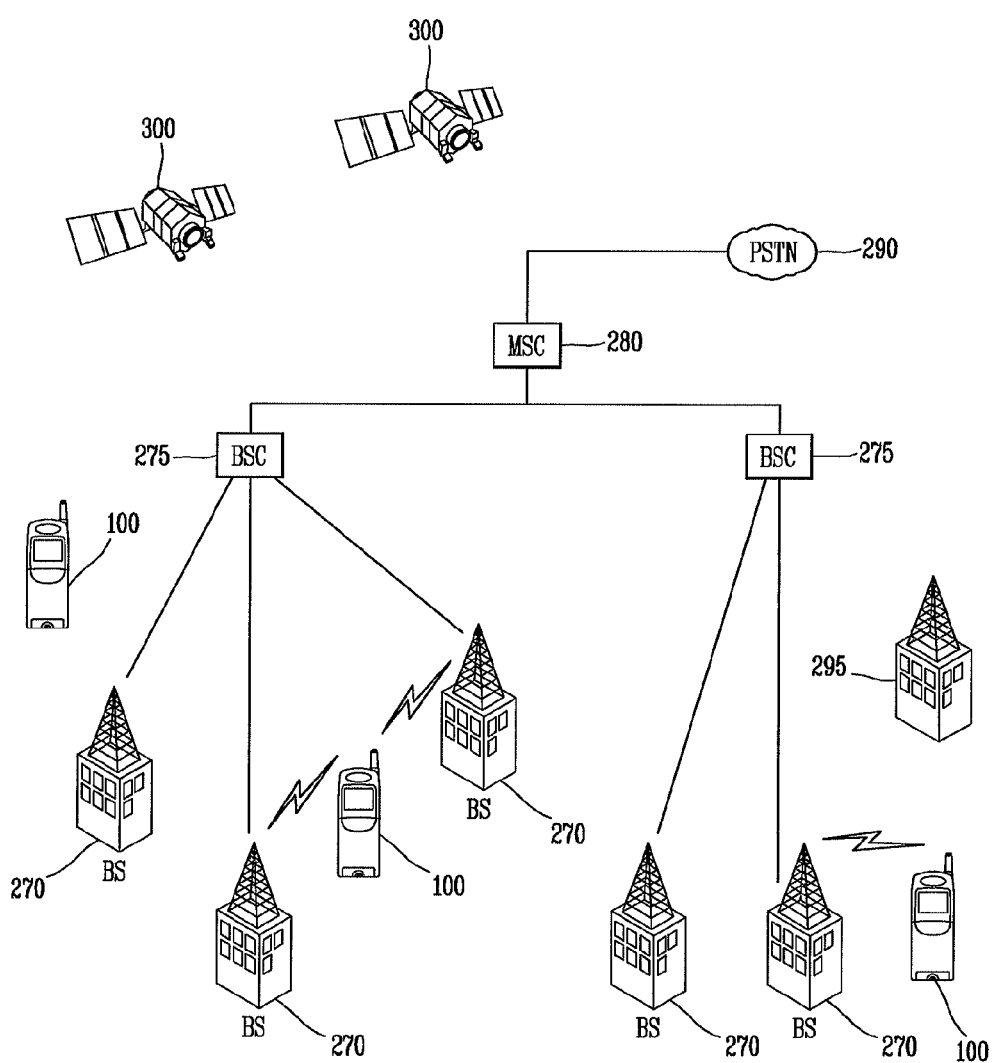
FIG. 2 is a block diagram illustrating a wireless communication system in which a mobile terminal associated with an embodiment of the present disclosure can be operated.

As illustrated in FIG. 2, a CDMA communication system is configured to be connected to a plurality of terminals 100, a plurality of base stations (BSs) 270, a plurality of base station controllers (BSCs) 275, and a mobile switching center (MSC) 280. The MSC 280 is configured to be connected to a public switched telephone network (PSTN) 290, and also configured to be connected to BSCs 275. The BSCs 275 may be connected to BSs 270 in pairs through a backhaul line. The backhaul line may be provided with at least one of E1/T1, ATM, IP, PPP, Frame Relay, HDSL, ADSL, and xDSL. Accordingly, a plurality of BSCs 275 may be included in a system as illustrated in FIG. 2.

Each BS 270 may include at least one sector, and each sector may include an omni-directional antenna or an antenna directing a specific radial direction from the BS 270. Alternatively, each sector may include two or more antennas in various shapes. Each BS 270 may also be configured to support allocation of a plurality of frequencies in which each frequency allocation has a specific spectrum (for example, 1.25 MHz, 5 MHz, etc.).

An intersection between the sector and the frequency allocation may be referred to as a CDMA channel. The BSs 270 may also be referred to as Base Station Transceiver Subsystems (BTSs), In this case, the term "base station" may refer to a combination of one BSC 275 and at least one BS 270. The base station may also designate a "cell site". Alternately, each of the sectors with respect to a specific BS 270 may be referred to as a plurality of cell sites.

As illustrated in FIG. 2, a Broadcasting Transmitter (BT) 295 serves to transmit a broadcast signal to the terminals 100 operating in the system. The broadcast receiving module 111 illustrated in FIG. 1 is provided in the terminal 100 so as to receive the broadcast signal transmitted by the BT 295.

Moreover, FIG. 2 illustrates multiple Global Positioning System (GPS) satellites 300. The satellites 300 serve to detect a position of at least one of the multiple terminals 100. Two satellites are illustrated in FIG. 2, however, useful position information may be obtained by more or less than two satellites. The GPS module 115 illustrated in FIG. 1 cooperates with the satellites 300 so as to obtain desiring position information. Here, the module 115 can track the position using all techniques allowing to track positions, as well as the GPS tracking technology. Also, at least one of the GPS satellites 300 may handle satellite DMB transmission alternatively or additionally.

Among typical operations of a wireless communication system, a BS 270 serves to receive reverse link signals from various terminals 100. At this time, the terminal 100 is connecting a call, transmitting and/or receiving a message or executing other communication operations. Each reverse link signal received by a specific base station 270 is processed within the specific BS 270. Data generated resulting from the processing is transmitted to the connected BSC 275. The BSC 275 serves to allocate a call resource and manage mobility, including systemization of soft handoffs between the BSs 270. Also, the BSC 275 transmits the received data to the MSC 280, and then the MSC 280 provides an additional transmission service so as to be connected to a PSTN 290. Similarly, the PSTN 290 is connected to the MSC 280 and the MSC 280 is connected to the BSCs 275, and the BSCs 275 control the BSs 270 so as to transmit forward link signals to the terminals 100.

The present disclosure proposes a camera function using augmented reality (AR) and cloud technologies to recall past events for a specific location (tourist resort/building), namely, a scheme for searching photos stored in or shared by the memory of the mobile terminal, and SNS and cloud systems associated with the relevant location when the focus of a camera view is placed on the relevant location and displaying the searched result at a specific location.

The function may be more useful in an environment that 3G/LTE is generally used and cloud systems are actively used. In particular, the function will be more accurately operated in case where the capture date, location and brief memo, and the like are written when photos are stored in or shared by SNS and cloud systems.

The present disclosure provides a viewer function for allowing the user to search the information of photos shared by family/relative/friend/my photos stored in each cloud system and SNS through a camera view using an augmented reality (AR) function at a specific place (tourist resort, specific building, mountain, sea, hometown, etc.) with precious memories and display the searched photos at the relevant location within a range specified by the user, and a capture function for capturing a new photo with the same location and composition as the relevant photo when the searched content is a photo.

The viewer function for displaying the information of the searched photos (photos or location information) may include a time sorting function for viewing a children's grown up procedure, hometown scenes ten years ago, and the like in the time sequence, and a location sorting function for determining at which place the photo was taken for each street.

Of the searched information, photos adjacent to one another by a predetermined distance are sorted and displayed in a region different from the location information, for example, an upper end of the screen, on the camera view.

When displaying the searched photos, photos for which their locations have been stored are displayed with a different color on the screen, thereby allowing the user to explore his or her memories by connecting them to the stored location when a trace function is selected on the camera view menu.

The present disclosure provides a setting menu capable of setting a search range and a sort range of photos stored in the SNS and cloud systems the setting menu may include items capable of setting a search region, a sort method, a DB source range, a lock setting, a trace, and the like.

Figure 3A:
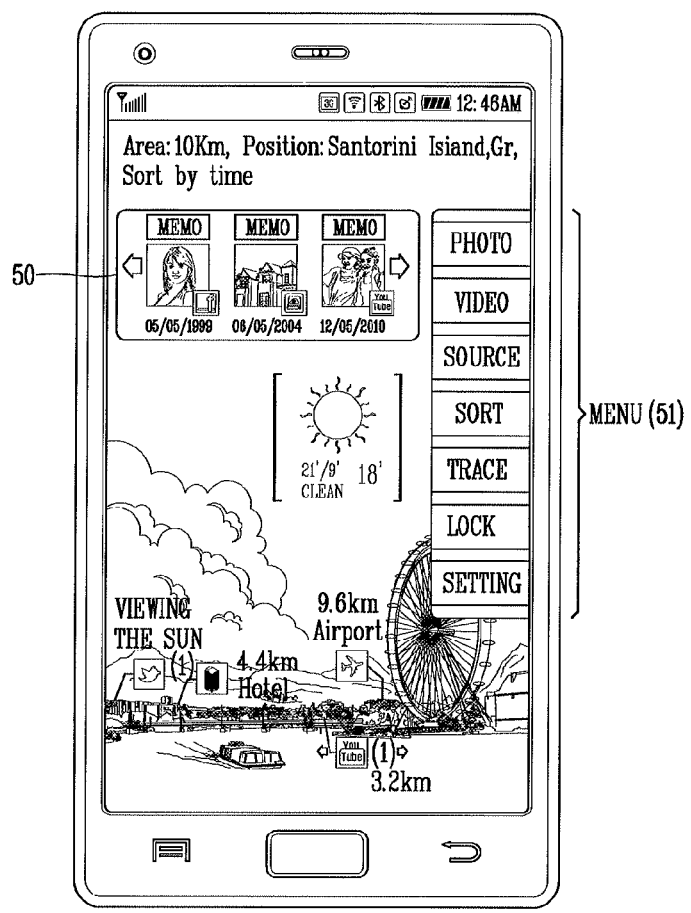
FIGS. 3A and 3B are views illustrating a screen on which location information associated with a specific place is displayed on an augmented reality based camera view according to an embodiment of the present disclosure.
Figure 3B:
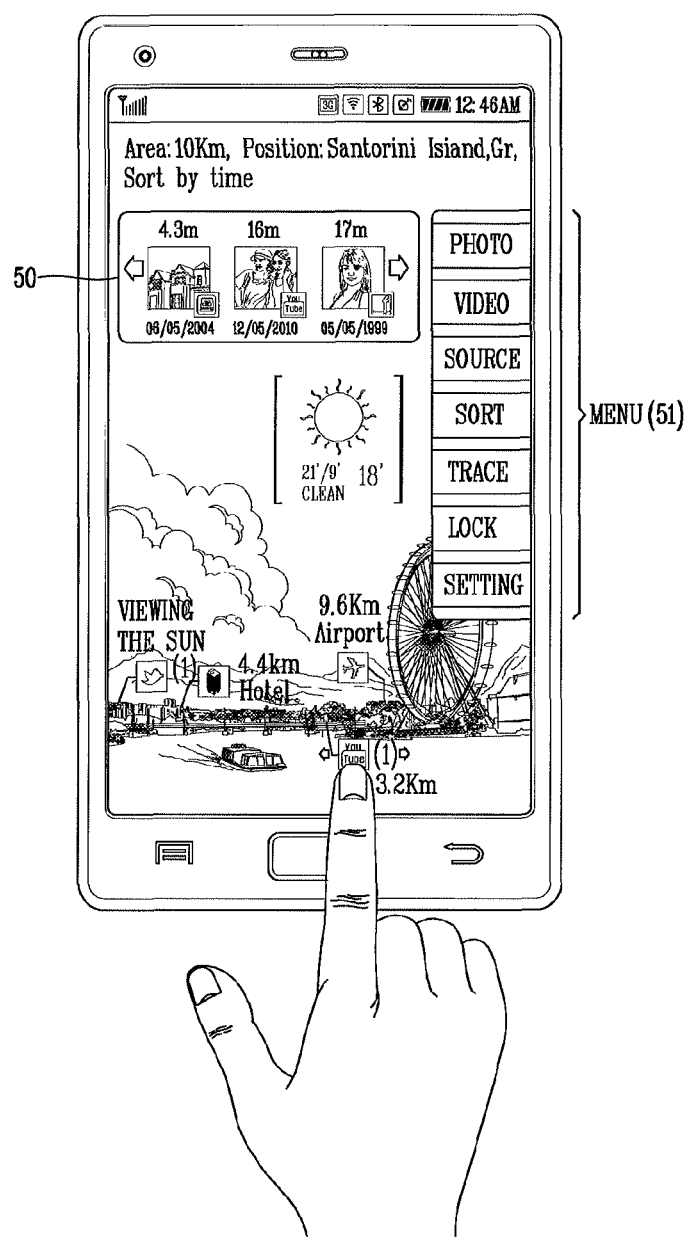

FIGS. 3A and 3B illustrate a screen on which location information associated with a specific place is displayed on an augmented reality based camera view according to an embodiment of the present disclosure. FIG. 3A is an example of sorting and displaying photo information based on time, and FIG. 3B is an example of sorting and displaying photo information based on distance.

When the user executes a predetermined mode in the menu or executes an application implemented in a shortcut form, an augmented reality based camera view is displayed on the display unit 151.

Objects (places, sceneries) based on augmented reality and photo information stored in connection with the objects along with the object information (name) are basically searched and sorted from the cloud and SNS systems and displayed on the camera view (preview).

The objects may include all spaces that can be accessed by the user, such as a tourist resort, a specific building, a mountain, a sea, a hometown, and the like.

The photo information may include information such as an actual photo (family/relative/friend/my photo) searched from the cloud and SNS systems, a title of the photo (or memo), a number of photos and a source in which the photo is stored, and the like. In particular, at least one or more photos located within a predetermined proximity distance among the searched photos are displayed in a separate region 50 of the camera view. The separate region 50 is a region for displaying the sorted photos, and basically displayed at an upper end portion of the camera view but the displayed location may be changed based on the user's setting. A predetermined number of photos are only displayed in the display region 50, and an identifier is displayed when there further exist non-displayed photos. The identifier may be implemented in the form of an arrow. Furthermore, photo information (location information) displayed on the camera view is displayed in the icon form of a source, and an identifier (arrow) for viewing another source is displayed when there exist a plurality of photos at a specific location. When a photo displayed in the display region 50 is selected, the relevant photo is enlarged and displayed on the screen.

The retrieval of the photo information is carried out for objects within a search range (e.g., 5 km) specified by the user from the user's location.

The sorting of the searched photos is carried out based on a sorting method (time or distance). When the photos are sorted based on time, each photo (photo displayed in the display region) or a memo written when storing the photo is displayed at an upper end portion of the photo information, and a distance from the user's current location is displayed at an upper end portion of each photo or photo information when sorted based on distance. Furthermore, time information (date, time) at which the photos are taken are commonly displayed at a lower end portion of each photo displayed in the display region 50.

A photo search menu 51 is displayed on the camera view. the photo search menu 51 may be displayed for a predetermined period of time at the initial stage when the preview is executed. For another example, the photo search menu 51 may be displayed or disappeared based on the user's touch operation.

The photo search menu 51 may include at least one sub-menu for setting a search range and a sort range of the photo to be searched from the cloud and SNS systems. The at least one sub-menu may include a menu for capturing a photo or video, a source menu for setting a DB source in which the relevant photo is stored, a sorting menu for setting a sorting method (time or distance), a trace menu for providing the function of finding a place at which the photo was captured in the past, a lock menu for setting whether to display the search result, a setting menu for setting a sorting range (proximity distance) of the photo to be displayed in the display region 50, and the like. The sub-menus may be incorporated with one another or separated from one another when required.

Furthermore, the search conditions of the photos are summarized (e.g., search range, current location and sorting condition) and displayed at an upper end of the display region 50.

Figure 4A:
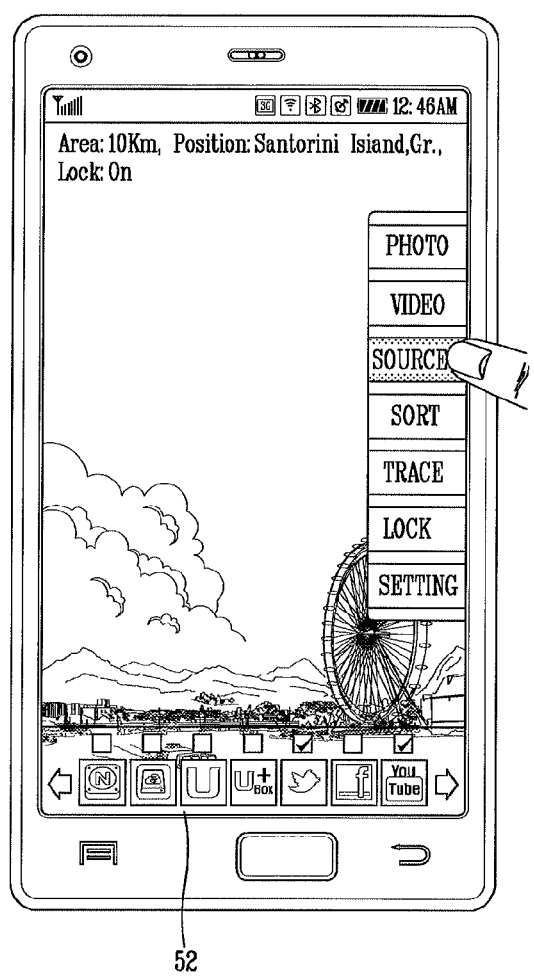
FIGS. 4A through 4C are examples for setting a search range and sorting method of photos to be searched to cloud and SNS systems using each item contained in a photo search menu.
Figure 4B:
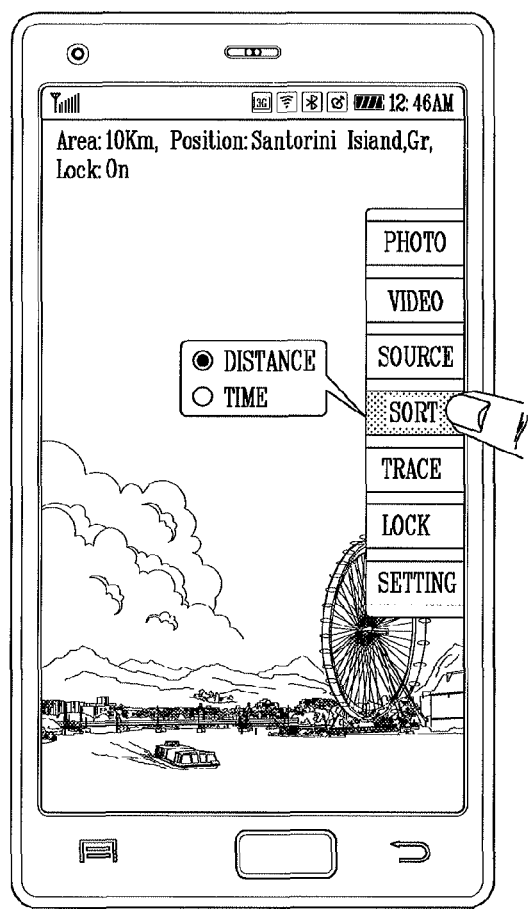
Figure 4C:
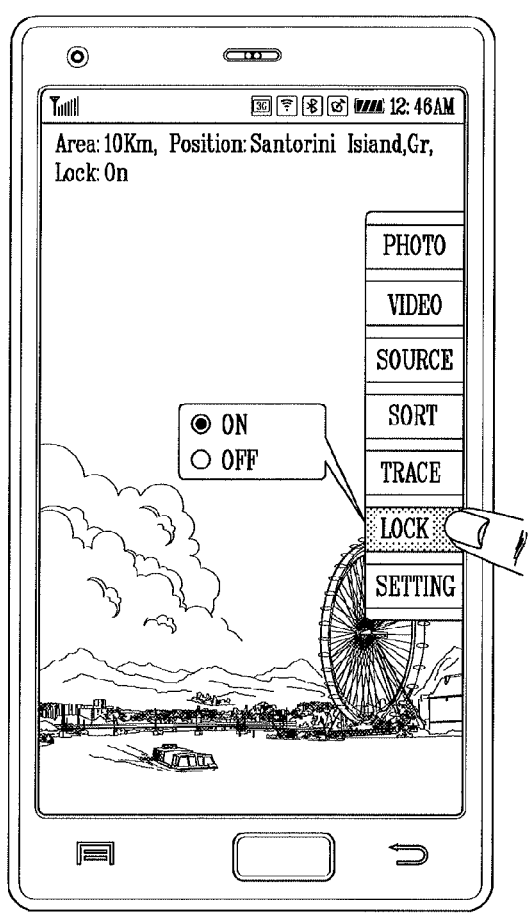

FIGS. 4A through 4C are examples for setting a search range and sorting method of photos to be searched to cloud and SNS systems using each item contained in a photo search menu.

FIG. 4A is an example of selecting a search source of the photo using a photo search menu.

When the user selects a source menu of the photo search menu 51, a DB source region 52 is displayed at a lower end portion of the camera view (preview). A plurality of source lists in the icon form that can be searched from the cloud system and SNS network used by the user, a check box that can be selected for each source, and an identifier indicating that there exist other sources that are not displayed in the DB source region 52 are displayed in the DB source region 52. Accordingly, the user searches a plurality of sources using the identifier, and selects at least one source to search photos using the check box.

FIGS. 4B and 4C are examples of sorting the searched photos and selecting a lock setting using a photo search menu.

As illustrated in FIG. 4B, the user selects a sorting menu from the photo search menu 51, and selects whether to display photos searched from the cloud and SNS systems for each street or whether to display them for each time. Furthermore, the user may set the lock setting to ON or OFF for the searched photos using a lock menu. At this time, for the lock menu, OFF is a default setting, and the controller 180 displays a search result for each source on the screen when the user requests a photo search in this state. If the lock menu is set to ON (lock mode), then the controller 180 does not display the photo search result on the screen, and displays photos in a lock state even in the display region 50 at an upper end thereof.

Figure 5A:
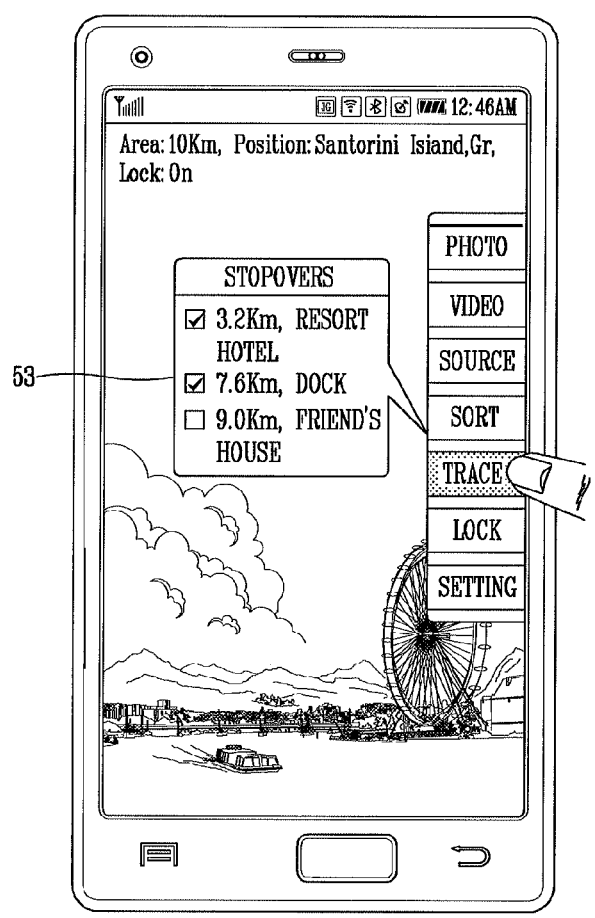
FIGS. 5A through 5C are views illustrating the setting of a trace menu and the display of a screen thereof in a photo search menu.
Figure 5B:
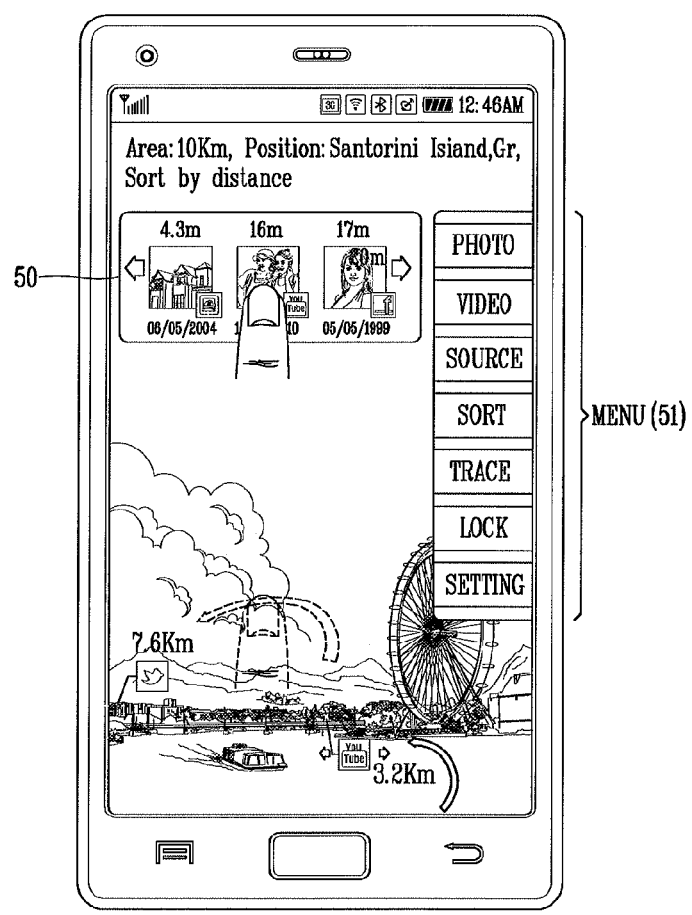
Figure 5C:
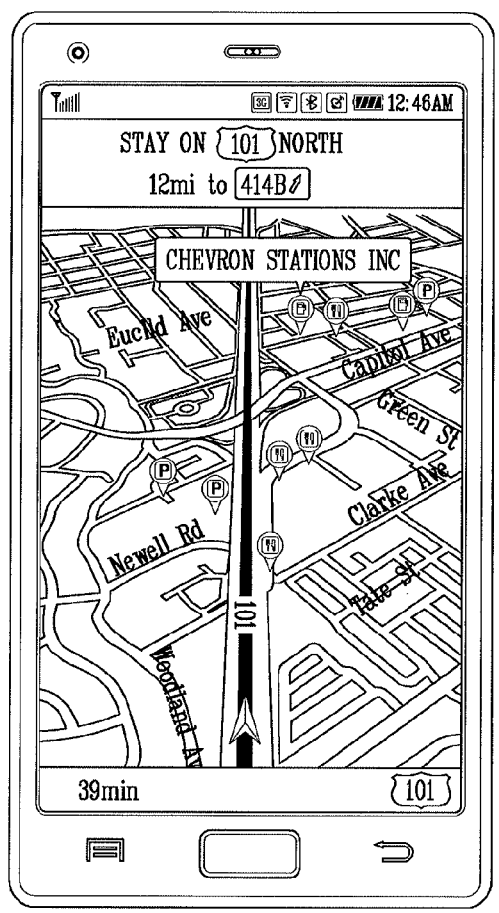

FIGS. 5A and 5C are views illustrating the setting of a trace menu and the display of a screen thereof in a photo search menu.

When the user selects a specific photo displayed in the display region 50 in a camera view mode and then presses a store button to store the location of the relevant photo, it is displayed with a red color on the camera view screen.

The trace menu is a menu activated when the location information is stored, and thus may not be selected because it is gray-processed when the location information is not stored. When the trace menu is selected, the location information list 53 is displayed within the stopover item. When the user selects a specific list, a route from the closest location to the next location is displayed as an arrow as illustrated in FIG. 5B. When the user selects a specific arrow, the controller 180 connects the navigator to a GPS service to display the fastest road to reach the relevant location on the screen as illustrated in FIG. 5C.

Furthermore, the trace menu provides a same place search function capable of searching the same location as a location in the photo captured in the past, and selects a desired mode from the photo capture mode to take a picture when arriving at the relevant location.

Figure 6:
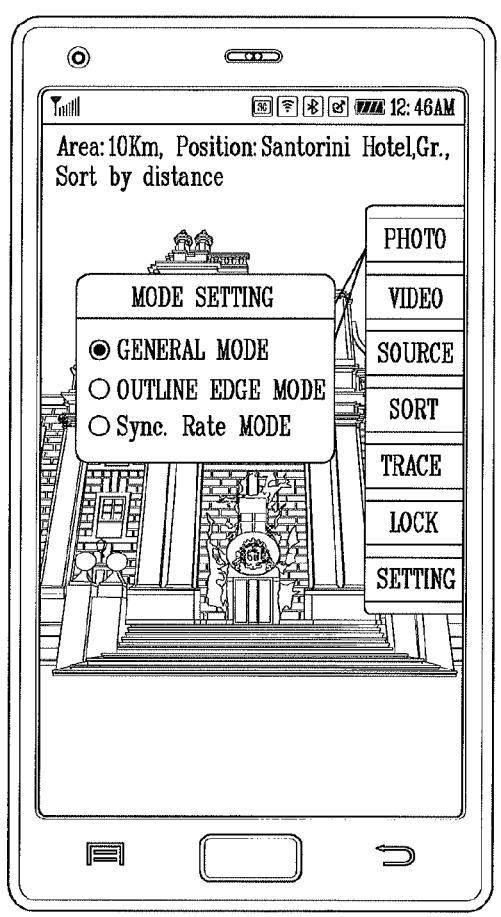
FIG. 6 is a view illustrating an example of the mode setting for performing a photo capture at the same location as a place in the photos captured in the past.

FIG. 6 is a view illustrating an example of the mode setting for performing a photo capture at the same location as a place in the photos captured in the past.

A trace function using the trace menu may depend only on GPS information, and thus a deviation from the correct location at which the photo was taken in the past may occur. In order to compensate the deviation, an outline edge mode and a synchronization rate mode may be additionally used other than a general mode in a mode setting menu of the photo menu.

The general mode is a typical photo taking mode in which the location information is not stored, and the outline edge mode and synchronization rate mode are modes activated when the location information of the photo is stored in a terminal (inactivated in a default setting). The outline edge mode and synchronization rate mode may be activated when there exists location information stored by the user, and selected by the user's requirement. The outline edge mode may be used when a photo is desired to be taken with the same composition at the same location as the previous one, and the synchronization rate mode may be used when a photo is desired to be taken with a similar composition at the same location as the previous one. At this time, a criterion for determining whether or not the location information of the photo is stored may be based on a case where the location information is stored when the user selects a specific image in a camera view state to press the store button.

Figure 7B:
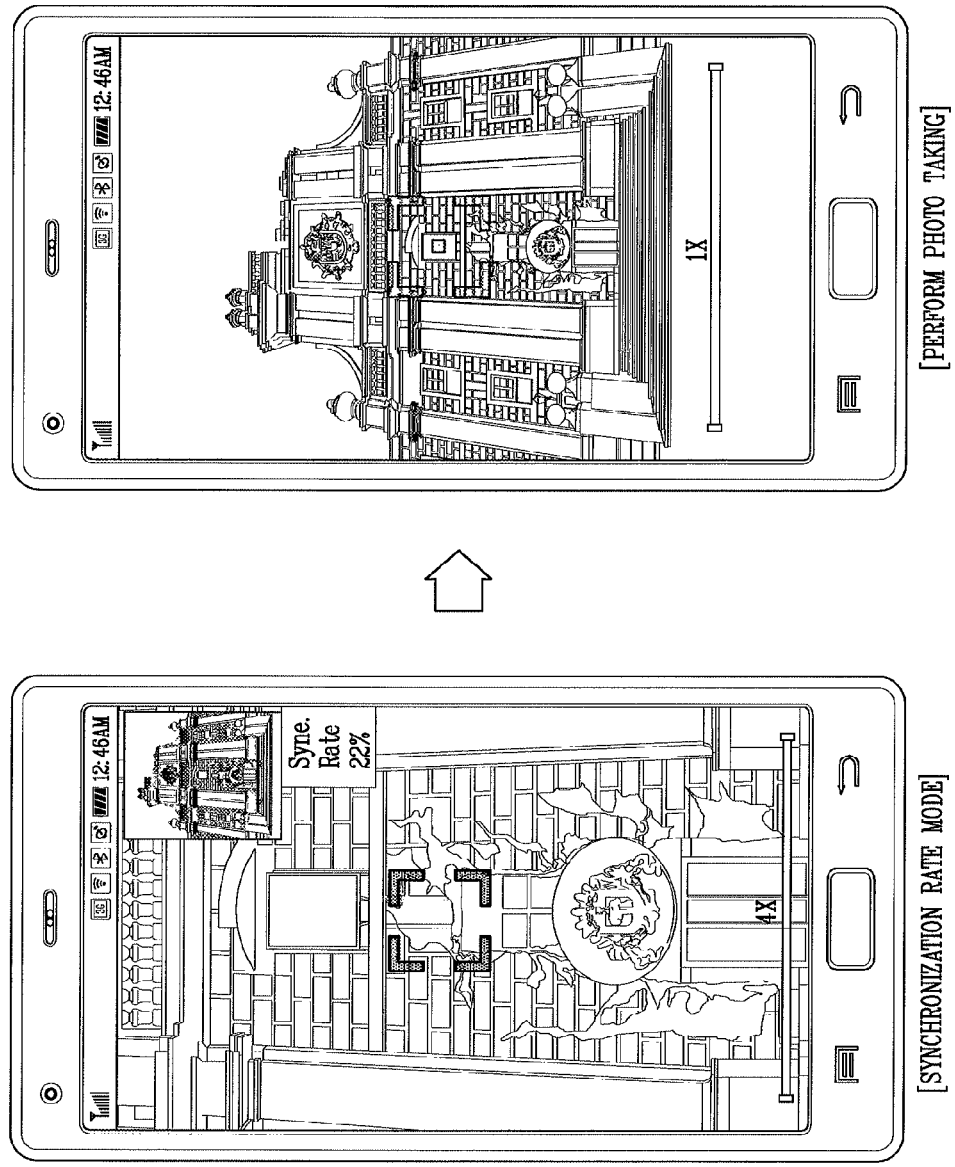

FIGS. 7A and 7B are views illustrating an example of performing a photo capture using an outline edge mode and a synchronization rate mode.

As illustrated in FIG. 7A, when the user selects an outline edge mode in the photo taking mode, the controller 180 may extract an outline of the existing photo and then display it to be overlapped with the camera view. The user may use a zoom function or move the location such that the outline of the existing photo is identical to an outline currently shown on the camera view, thereby taking a photo at the same location as the exiting photo.

On the contrary, as illustrated in FIG. 7B, when the user selects a synchronization rate mode in the photo taking mode (or when pressing an AF button of the camera view), the controller 180 may specify a synchronization rate between the existing photo and the current camera view on the screen to display a level at which a current composition is identical to the existing photo.

Hereinafter, a method of sorting and displaying photos searched from the cloud and SNS systems based on the various user's settings configured on an augmented reality based camera view will be described below with reference to the accompanying drawings.

Figure 8:
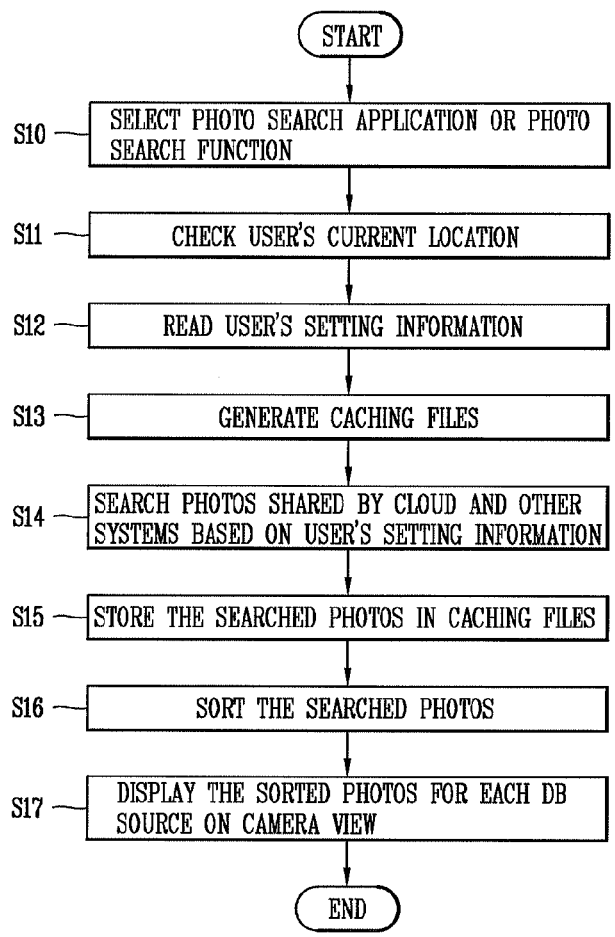
FIG. 8 is a flow chart illustrating a photo search method in a mobile terminal according to an embodiment of the present disclosure.

FIG. 8 is a flow chart illustrating a photo search method in a mobile terminal according to an embodiment of the present disclosure.

The user may configure a search range (radius), a contents display range, a DB source, and a sorting method to search and sort photos in the photo search menu 51.

The search range indicates a range for searching photos located within a radius of several kilometers to several tens of kilometers (e.g., 500 m, 1 km, 5 km, 10 km, 30 km) around the current location as described above, and the contents display range is a range for searching photos shared by the cloud and SNS systems such as persons, families, colleagues, friends, pets, and the like. The ranges are items selected through setting menus, and for example, they may be selected in the form of check boxes.

The DB source is a service provider for which the user wants to search photos in a list of cloud and SNS service providers subscribed by the user, and it may be selected in the form of a check box within the source menu.

The sorting method is configured in the sorting menu, and indicates that photos searched from the cloud and SNS systems are sorted by time and street.

Furthermore, the user may select the display of a specific place, for example, a famous lodge, a restaurant, and a tourist resort. Since photos are mostly stored along with travels, and the information of the places may be selected in the form of a check box to be displayed on the camera view.

Furthermore, the user may perform a proximity distance setting, a file store setting, and a location information delete setting in the setting menu.

The proximity distance setting is to configure a proximity range (distance) (10 m, 30 m, 50 m, 100 m) to be displayed in the photo sorting box 50, and only photos within the above range are displayed in the display region 50. The file store setting indicates a setting for whether to store the searched photos in a secure digital (SD) card or embedded memory, and the location information delete setting indicates a setting for which the stored location information can be deleted when required to be deleted. All the configured user's setting values are stored in the memory 160.

As illustrated in FIG. 8, when the user selects a photo search function or executes photo search application (shortcut function) in the camera view (S10), the controller 180 checks the user's current location using GPS information (S11). When the user's current location is confirmed, the controller 180 reads user's setting values (search range, DB source, contents display range, etc.) from the memory 160 (S12), and then generates caching files (S13).

When the caching files are generated, the controller 180 searches photos (photo information: photos and location information) within the user's preset DB source and search range from the cloud and SNS systems (S14) and then stores them in the caching files (S14, S15).

Accordingly, the controller 180 sorts the stored photos based on the preset sorting method and then turns on the camera view to display a search result on the camera view for each DB source (cloud system and SNS network) (S16, S17).

The searched photos are sorted by time and distance based on the setting of the sorting menu and setting menu. Some of the sorted photos, namely, photos corresponding to the proximity distance setting are displayed in the display region 50 based on the sorting method (distance or time), and the remaining photos are displayed in the form of icons on the camera view. The DB and memo in which photos are stored are displayed on the display region 50 and destination when the searched photos are sorted by time, and the DB source in which photos are stored and a distance to the destination are displayed when sorted by distance.

Accordingly, the user may search photos within the display region 50 or photo summary information on the camera view to view his or her desired photos, and display the photo search menu 51 in detail by a simple touch operation to change various setting values currently displayed on the camera view.

Figure 9B:
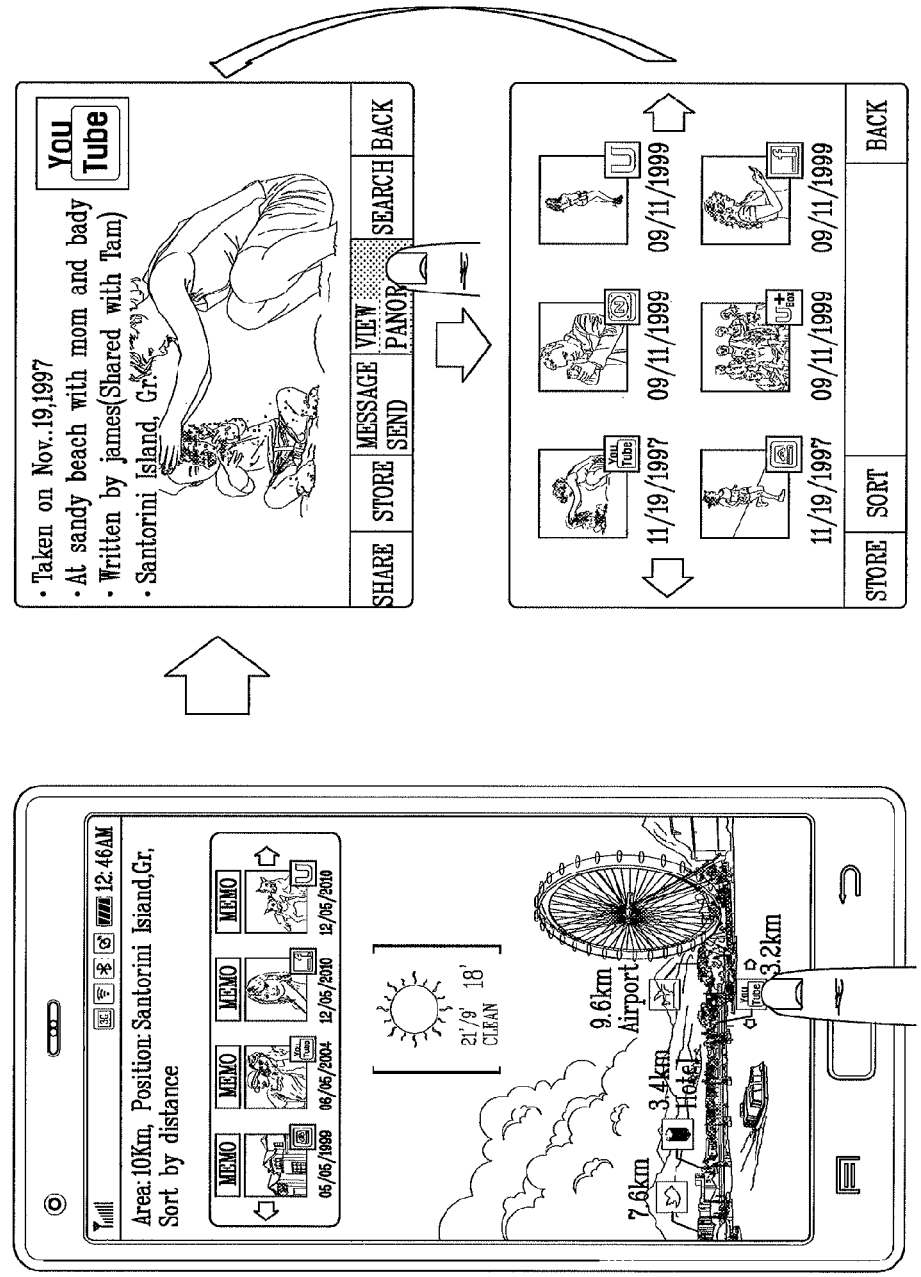

FIGS. 9A and 9B are views illustrating an example of selecting location information on a camera view and displaying photos associated with the relevant region.

When photos shared by the cloud system or SNS network are displayed on the camera view based on the user's configured search conditions (search range, contents display range, DB source and sorting method), the user may select his or her desired photos from the displayed photos. At this time, the selection of photos may include both the selection of actual photos displayed in the display region 50 and the selection of icons displayed in a region other than the display region 50.

FIG. 9A is an example of selecting one photo captured at a specific place within a photo search result displayed on the camera view based on distance.

As illustrated in FIG. 9A, when the user selects a specific icon indicating a DB source on the camera view, the controller 180 displays photos corresponding to the relevant search result. The stored DB source (e.g., Twitter) is displayed at an upper right end portion of the displayed photo and the summary information of the photo (a date and time for the stored photo, a written memo, a writer, a sharer, and a photo capture location) is displayed at an upper left end portion thereof. Furthermore, a menu capable of performing a subsequent operation (store, share, message transmission, search, back, etc.) for the relevant photo is displayed at a lower end portion of the photo.

For example, when the user arrives at the relevant location based on location information stored along with the photo but the place has been changed due to any reason such as development, maintenance, removal, and the like, he or she may be anxious to know the reason. In this case, when a search menu is selected, the relevant article may be displayed based on location information, thereby allowing the user to know due to what kind of reason the current location has been changed. Furthermore, the user may search whether there is an admission fee for places in his or her memory, restaurant prices in the old days, a relocated places, lodging places, or the like. The search range can be retrieved in various manners by selecting various blogs, twitters, papers, broadcasts and others. For example, restaurant prices, lodging places, admission fees at the surroundings in the old days may be specified and restaurant prices, lodging places, and the like in the present days may be also specified based on the date of the stored photo and the location information of GPS, thereby allowing the user to know how much they have been changed. The content desired to be scrapped from the searched contents may be transmitted to his or her own cloud, SNS, blog or e-mail.

FIG. 9B is an example of selecting a plurality of photos captured at a specific place within a photo search result displayed on the camera view based on distance. In particular, when a plurality of photos are stored or shared by a plurality of DB sources at the same place, one representative photo icon may be initially displayed and the remaining photos may be retrieved using an arrow.

Accordingly, when the user selects a specific icon indicating a DB source on the camera view, the controller 180 displays photos corresponding to the relevant search result. As illustrated in FIG. 9A, the stored DB sources (e.g., You Tube) are displayed at an upper right end portion of the displayed photo, and the summary information of the photo (a date and time for the stored photo, a written memo, a writer and a sharer, and a photo capture location) is displayed at an upper left end portion thereof. The user may select an identifier (e.g. arrow) indicating that there are other more photos to view other photos. Furthermore, a menu capable of performing a subsequent operation (store, share, message transmission, panorama, search, back, etc.) for the relevant photo is displayed at a lower end portion of the photo.

When a panorama view menu is selected from the menus, the controller 180 displays photos shared by each DB source on the screen. The user may select an identifier (e.g. arrow) indicating that there are other more photos to view other photos, and sort photos by time using a sorting menu.

Figure 10:
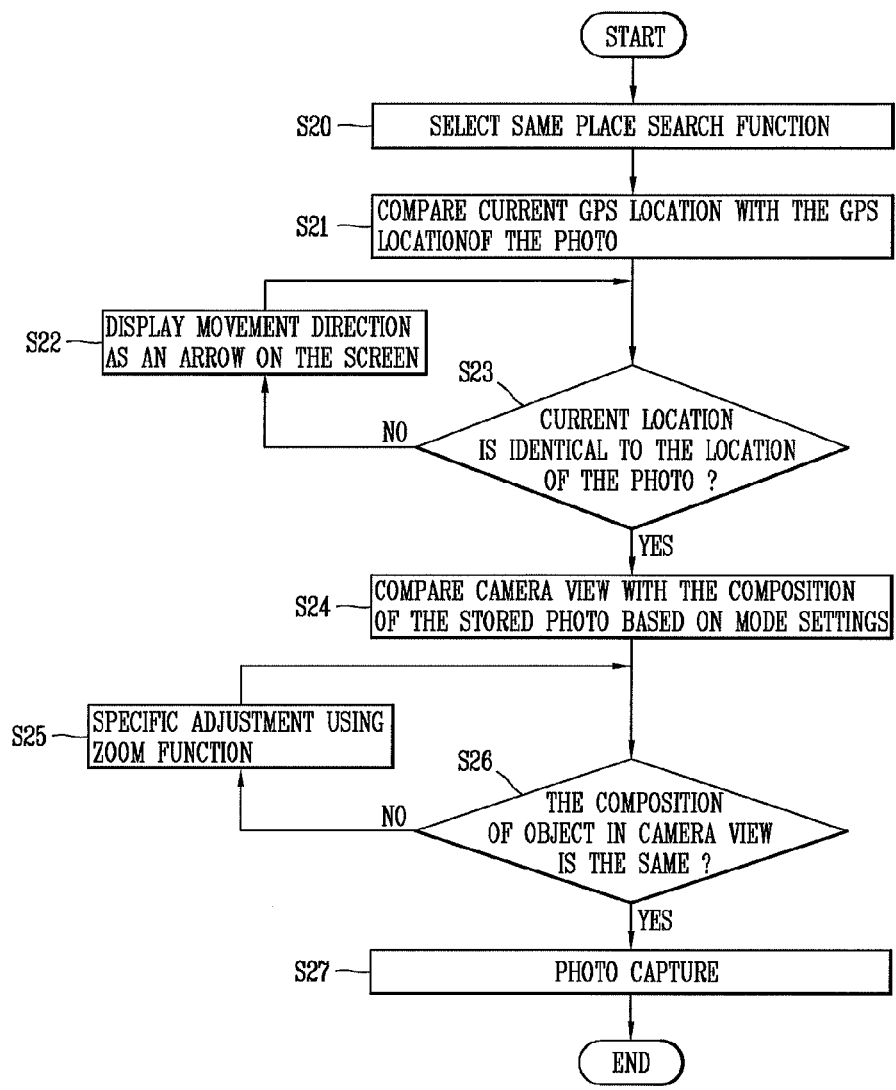
FIG. 10 is a flow chart illustrating the operation of capturing a photo at the same location as the previous photo using a same place search function.

FIG. 10 is a flow chart illustrating the operation of capturing a photo at the same location as the previous photo using a same place search function.

When the user selects a same place search function while visiting a previous capture location by selecting a trace menu, the controller 180 compares a current location with the location of the user's selected previous photo using GPS (S20, S21).

As a result of comparison, when the two locations are not identical, the controller 180 displays a direction in which the user should move on the screen as an arrow in connection with the navigation function (S22), and when the two location are identical, the composition of the camera view is compared with that of the stored previous photo (S23, S24).

When comparing the camera view (current composition) with the composition of the stored previous photo, the controller 180 extracts an outline of the previous photo based on the user's setting (outline edge mode or synchronization rate mode) to display it on the camera view or display a synchronization rate between the previous photo and the current composition on the screen.

As a result of comparison, the controller 180 uses a zoom function or moves the location to allow the two compositions to be identical when the composition on the camera view is not identical to that of the previous photo (S25), and the controller 180 controls the camera 121 to perform a capture operation at the same composition as that of the previous photo when the two compositions are identical (S26, S27).

Figure 11:
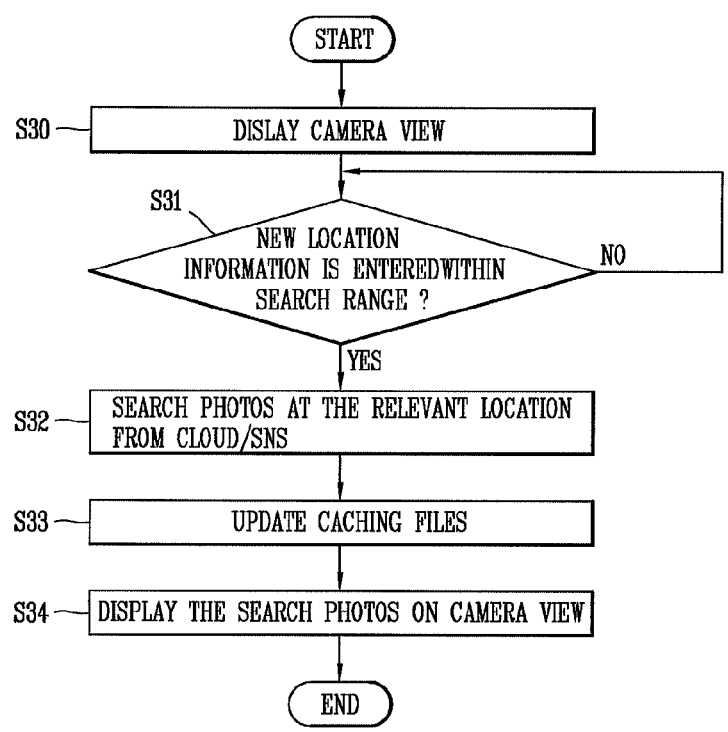
FIG. 11 is a flow chart illustrating the operation of searching a photo when new location information is entered within a search range by the movement of the user.

FIG. 11 is a flow chart illustrating the operation of searching a photo when new location information is entered within a search range by the movement of the user. In particular, FIG. 11 is an operation of updating the display of photos on the camera view when the user moves and thus a previous capture location is newly entered within a search range of the camera view.

When the location information of a new photo is entered within a search range by the user's movement or menu setting change in a camera view display state (S30, S31), the controller 180 checks the relevant location and then searches photos at the relevant location based on the user's setting from the cloud and SNS systems (S32), and updates caching files (temporary storage) and then sorts and displays the searched files on the camera view to update a search result (S33, S34). Then, photos corresponding to the location information out of the search range are deleted from the storage files, and photos selected for storage by the user are stored in the memory 160.

Figure 12:
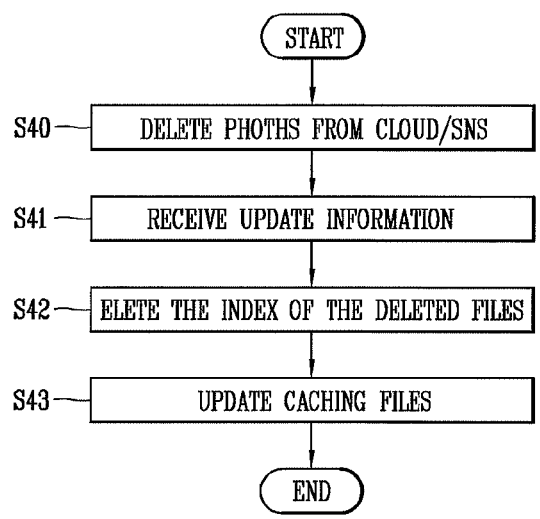
FIG. 12 is a flow chart illustrating the operation of updating a search result when a photo is deleted from a cloud or SNS system.

FIG. 12 is a flow chart illustrating the operation of updating a search result when a photo is deleted from a cloud or SNS system.

When a specific photo shared by the cloud or SNS system is deleted (S40), update information is received from the relevant cloud or SNS system. The controller 180 checks and deletes an index of the deleted photos based on the received update information, and then updates caching files, and updates a search result displayed on the camera view (S41-S43).

In this manner, as illustrated in FIG. 11, the controller 180 updates a search result on the camera view based on the movement of the user or updates a search result on the camera view based on the removal of a specific photo in the cloud or SNS system.

As described above, according to the present disclosure, when the focus of the camera view through augmented reality is placed on a specific place with user's memories (a tourist resort, a specific building, a mountain, a sea, a hometown, etc.), the controller 180 searches photos shared by family, relative, friend, and my photos stored in the cloud and SNS systems to sort and display them on the camera view, thereby allowing the user to conveniently search photos associated with old memories.

Accordingly, according to the present disclosure, photo information shared by the cloud and SNS systems associated with a specific location on the camera view using augmented reality are searched and displayed, thereby allowing the user to recall the past events, and a search for various information on the location of the relevant photo and a function capable of capturing a photo at the same location as a location captured in the past are provided, thereby having an effect capable of providing convenience to the user.

Furthermore, according to an embodiment of the present invention, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave (for example, transmission via the Internet). The computer may include the controller of the terminal.

The configurations and methods according to the above-described embodiments will not be applicable in a limited way to the foregoing terminal, and all or part of each embodiment may be selectively combined and configured to make various modifications thereto.

What is claimed is:

1. A photo search method of a mobile terminal, the method comprising:
    displaying, on the mobile terminal, an augmented reality based camera view;
    searching photo information associated with at least one location on which a focus of the camera view is placed from a network system;
    displaying the searched photo information at each location on the camera view;
    displaying a list of locations at which photos are captured when a trace function is selected in a state that the searched photo information is displayed;
    displaying routes from a closest location to one or more next locations as arrows, respectively, when specific location is selected from the list; and
    displaying a fastest route that can be followed to a selected next location when a specific arrow is selected from the arrows.

2. The method of claim 1, wherein the at least one location comprises a tourist resort, a specific building, a mountain, a sea or a hometown, and the network system comprises a cloud system or a social network services (SNS) system.

3. The method of claim 1, wherein the photo information comprises photos and location information, and is displayed and sorted by time or distance.

4. The method of claim 3, wherein the photos are displayed in a region apart from the location information as photos captured at a location within a predetermined proximity distance.

5. The method of claim 1, wherein the photo information is updated to new photo information searched from the network system when a new location is entered on the camera view by a movement of a user or the user changes a search range.

6. The method of claim 1, wherein said searching step comprises:
    checking a user's current location, when a photo search function is selected;
    reading pre-stored search settings;
    searching photos within a content display range shared by a database (DB) source of cloud or social network services (SNS) systems around a search range based on the read pre-stored search settings; and sorting the searched photos based on a sorting method and proximity distance.

7. The method of claim 1, wherein the searching comprises:
  a search range indicating a distance for searching photos from a user's current location;
  a contents display range indicating a kind of searched photos;
  a database (DB) source indicating a service provider for searching photos;
  a sorting method for sorting the searched photos by time or distance; and
  a proximity distance range indicating a proximity distance to be displayed at a one side region of the camera view.

8. The method of claim 1, further comprising:
  displaying photos captured at a relevant location when the displayed photo information is selected;
  searching information associated with the relevant location and displaying the information on a screen when a search function for the displayed photos is selected; and
  transmitting the displayed information to a network system for storing or sharing.

9. The method of claim 8, wherein the information associated with the relevant location is searched from various blogs, twitters, papers and broadcasts, and the searched information is transmitted via cloud, SNS, blog or email based on a user's selection.

10. The method of claim 1, further comprising:
  comparing a user's location with locations of the photos when a same place search function is selected while moving to the selected next location;
  displaying a moving direction when the user's location and the selected next location are not the same, and displaying information for setting a composition of the camera view to a composition of a photo captured at the selected next location based on the user's mode setting when the user's location and the selected next location are the same; and
  performing a photo capture for the selected next location when the user moves or selects a zoom function based on the information such that the two compositions are identical.

11. The method of claim 1, wherein a user's mode setting is one of an outline edge mode for displaying that an outline of an existing photo is overlapped with a camera view and a synchronization rate mode indicating a synchronization rate between a composition of the camera view and a composition of the existing photo.

12. A mobile terminal, comprising:
  a display unit configured to display an augmented reality based camera view;
  a memory configured to store a user's search settings; and
  a controller configured to search photo information associated with at least one location on which a focus of the camera view is placed from a network system based on the search settings, and display relevant photo information for each storage source on the camera view,
  display a list of locations at which photos are captured when a trace function is selected in a state that the searched photo information is displayed,
  display routes from a closest location to one or more next locations as arrows, respectively, when a specific location is selected from the list, and
  display a fastest route to a selected next location when a specific arrow is selected from the arrows.

13. The mobile terminal of claim 12, wherein the at least one location comprises a tourist resort, a specific building, a mountain, a sea or a hometown, and the network system comprises a cloud system or a social network services (SNS) system.

14. The mobile terminal of claim 12, wherein the search settings comprises:
  a search range indicating a distance for searching photos from the user's current location;
  a contents display range indicating a kind of searched photos;
  a database (DB) source indicating a service provider for searching photos;
  a sorting method for sorting the searched photos by time or distance; and
  a proximity distance range indicating a proximity distance to be displayed at a one side region of the camera view.

15. The mobile terminal of claim 12, wherein the photo information comprises photos and location information, and the photos are displayed in a region apart from the location information as photos captured at a location within a predetermined proximity distance.

16. The mobile terminal of claim 12, wherein the controller displays the photo information by sorting the photo information by time or distance.

17. The mobile terminal of claim 12, wherein the controller updates the photo information to new photo information searched from the network system when a new location is entered on the camera view or the user changes a search range.

18. The mobile terminal of claim 12, wherein the controller deletes information associated with a specific photo based on updated information from the network system when the specific photo is deleted from the network system.

19. The mobile terminal of claim 12, wherein the controller checks the user's current location when a photo search function is selected and then reads re-stored search settings, and searches photos within a contents display range shared by a database (DB) source of cloud and social network services (SNS) systems around a search range at a current location based on the read pre-stored search settings, and sorts the searched photos based on time or distance.

20. The mobile terminal of claim 12, the controller displays photos captured at a relevant location when specific photo information is selected, and searches information associated with the relevant location and displays the information on a screen when a search function for the displayed photos is selected, and transmits the displayed information to a network system based on the user's input for sharing or storing.

21. The mobile terminal of claim 12, wherein the controller compares the user's location with a location of an existing photo when a same place search function is selected while moving to the selected next location, and displays a moving direction when the user's location and the selected next location are not the same, and displays information for setting a composition of the camera view to a composition of the existing photo captured at the selected next location based on the user's mode setting when the user's location and the selected next location are the same, and performs a photo capture for the user's location when the user moves or selects a zoom function based on the information such that the two compositions are identical.

22. The mobile terminal of claim 21, wherein the user's mode setting is one of an outline edge mode for displaying that an outline of the existing photo is overlapped with a camera view and a synchronization rate mode indicating a synchronization rate between the composition of the camera view and the composition of the existing photo, and the information is an outline or synchronization rate.

* * * * *